Oct. 24, 1950     E. F. ROSSMAN     2,527,034
SHOCK ABSORBER
Filed July 8, 1947
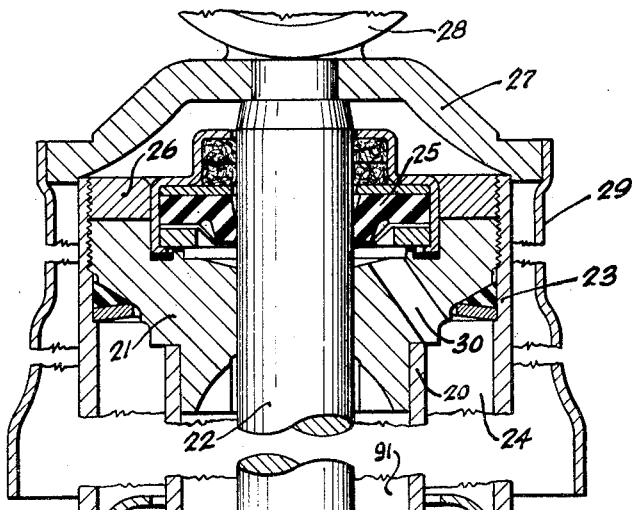
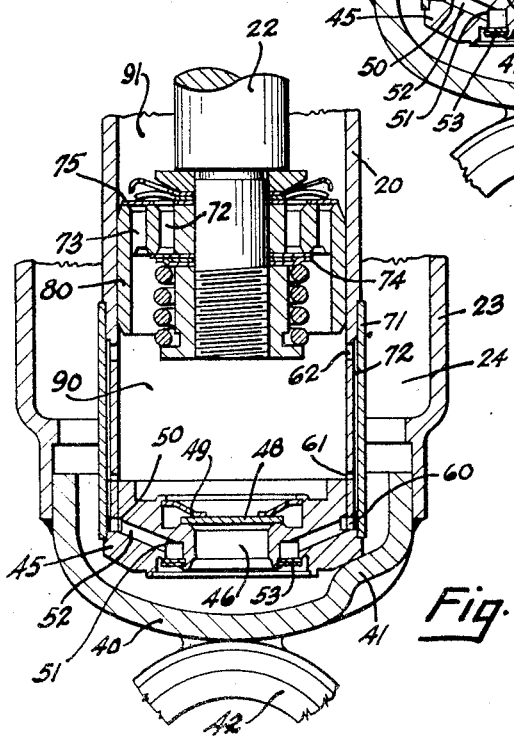
INVENTOR.
EDWIN F. ROSSMAN
BY
*Spencer, Hardman* *and Felix*
HIS     ATTORNEYS.

Patented Oct. 24, 1950

2,527,034

UNITED STATES PATENT OFFICE 2,527,034

SHOCK ABSORBER

Edwin F. Rossman, Dayton, Ohio, assignor to General Motors Corporation, Detroit, Mich., a corporation of Delaware Application July 8, 1947, Serial No. 759,586

3 Claims. (Cl. 188—88)

This invention relates to improvements in hydraulic shock absorber.

It is among the objects of the present invention to provide a hydraulic shock absorber with means for increasing the restriction to fluid flow therein as the piston approaches the end of its travel in one direction, thereby substantially preventing "bottoming" or striking the closure member at one end of the cylinder with damaging effect.

Further objects and advantages of the present invention will be apparent from the following description, reference being had to the accompanying drawings wherein a preferred embodiment of the present invention is clearly shown.

In the drawings:

Fig. 1 is a broken, longitudinal sectional view of the shock absorber equipped with the present invention.

Fig. 2 is a fragmentary view of the section shown in Fig. 1, the piston, however, being shown in a different position with the cylinder.

Referring to the drawings the numeral 20 designates the working cylinder of the shock absorber. At one end it has a portion of a head member 21 telescopically fitted into the cylinder, this head member having a central opening in which the piston rod 22 is slidably supported. A larger diameter portion of the head member 21 is exteriorly threaded to be received by the threaded end of a tube 23 which surrounds the cylinder 21 and forms an annular chamber therebetween hereinafter referred to as a reservoir 24. The outer end surface of the head member 21 is recessed to receive the packing assembly 25 having a member which sealing engages the piston rod 22 to permit its reciprocation through the packing gland. A locking ring 26 is also threaded into the end of the tube 23, engaging the head member 21 and locking it securely in position in the tube. The end of the rod 22 extends to the exterior of the shock absorber and has a disc 27 attached thereto and a mounting ring 28, this mounting ring providing the means for attaching the piston rod to one of the relatively movable members whose movement the shock absorber is adapted to control. Another tube 29 has its one end fitting about the disc 27 and is secured thereto in any suitable manner preferably by welding, this tube 29 forming a stone guard which surrounds the tube 23 substantially for a greater portion of its length when the shock absorber is collapsed as shown in Fig. 1. Ducts 30 are provided in the head member connecting the recess containing the packing gland assembly 25 and the interior of the reservoir 24, these ducts returning any liquid to the reservoir that might leak from the cylinder along the bearing in the head member supporting the piston rod 22.

The end of tube 23 opposite the head member 21 has a cup-shaped, closure member 40 secured thereto preferably by welding. This cup shaped closure member 40 has spaced inner ribs 41 for purposes to be described. A mounting ring 42 is secured to the closure member 40 and provides means for securing this end of the shock absorber to the second relatively movable member whose action the shock absorber is adapted to control.

A valve cage 45 has a portion telescopically received by the end of the cylinder 20 opposite the head member 21. This valve cage 45 rests upon the spaced ribs 41 of the closure member 40. Valve cage 45 has a central opening 46 surrounded by a ridge 47 on the side of the valve cage within the cylinder 20, this ridge 47 forming an annular seat upon which the valve 48 is normally yieldably urged by a ring secured in the valve cage and having inwardly extending resilient fingers 49 engaging valve 48. The peripheral surface of the valve cage 45 within the confines of the cylinder 20 has an annular groove 50. Another annular groove 51 is provided in the surface of the valve cage which rests upon the closure member 40. A plurality of ducts 52 extend between the annular grooves 50 and 51 providing communication therebetween. A valve 53, consisting of one or more ring shaped resilient discs, has the annular inner edge thereof secured to the valve cage in such a manner that the ring disc or discs are biased urging the outer peripheral portion against an annular valve seat 54 formed on the valve cage 45. Thus the opening 46 in the valve cage is normally closed by the spring loaded valve 48 engaging the cylinder side of the valve cage while the annular groove 51 on the opposite side of the valve cage is normally closed by the valve 53.

The cylinder 20 has a plurality of annular rows of openings arranged in a circular row in the annular wall of said cylinder. Openings 60 are at the end of the cylinder 20 engaging the valve cage 45, these openings 60 communicating with the annular groove 50 provided in the valve cage 45. Another row of openings 61 are in the wall of the cylinder 20 just above the inner edge of the valve cage 45. Still another circumferential row of openings 62 are in the wall of the cylinder but are arranged a predetermined distance from the openings 61. Openings 61 are comparatively smaller than the openings 62 while openings 60 are substantially the same size as openings 62.

The cylinder 20 is of reduced outside diameter for a portion of its length adjacent the valve cage 45, this reduced diameter portion is designated by the numeral 70. A sleeve 71 tightly fits about the cylinder 20 and particularly surrounds the reduced diameter portion of said cylinder and also fits about the valve cage 45. This sleeve forms an annular space 72 around the cylinder which space provides communication between the openings 62, 61 and 60 and thus communication between the openings 62 and 61 in the cylinder and the annular groove 50, ducts 52 and annular groove 51 in the valve cage 45.

A piston 80 is secured to the piston rod 22, this piston having a plurality of fluid passages, one group 72 arranged in an inner circular row while another group 73 are arranged in an outer surrounding circle. Passages 72 are normally closed by a spring loaded valve 74 while passages 73 are normally closed by a spring loaded valve 75. Valve 74 is operative to establish restricted flows of fluid through the piston passages 72 as the piston is moved upwardly in the cylinder toward the head member 21, while valve 75 is adapted to establish a substantially unrestricted flow of fluid through the passages 73 in the piston in response to the movement of the piston toward the valve cage member 45.

Fig. 1 shows the shock absorber in fully collapsed position while Fig. 2 shows the shock absorber in an extended position in which the piston 80 has the openings 62 in the cylinder fully uncovered. When the piston is moved toward the valve cage 45, by approaching movements of the relatively movable members between which the shock absorber is secured, the piston exerts pressure upon the fluid within the lower working chamber designated by the numeral 90, said fluid pressure moving the valve 75 from its seat to establish a substantially unrestricted flow of fluid from chamber 90 into the chamber 91 within the cylinder 20. Due to the presence of the piston rod 22 in chamber 91, all fluid displaced from chamber 90 cannot enter chamber 91 and consequently the fluid displaced by the piston rod 22 in the chamber 91 will be discharged through the openings 62 and 61 in the cylinder wall through the annular passage 72, ducts 52 to the annular groove 51 in the valve cage, this fluid pressure actuating the valve 53 to establish a restricted flow of fluid from the working chamber 90 into the reservoir 23. Continued movement of the piston 80 in the direction toward the valve cage 45 will eventually cover opening 62 after which fluid displaced by the piston rod 22 in the chamber 91 will be forced through the substantially reduced openings or orifices 61 in the cylinder wall, thereby greatly restricting the fluid flow from chamber 90 and consequently resisting to an increased degree the movement of the said piston 80 toward the valve cage 45. All fluid flow through the annular passage 72, established either by the combined openings 62 and 61 or the opening 61 alone is directed against the valve 53 which restricts the fluid flow from the ducts 52 of the valve cage. From this it may be seen that the movement of the shock absorber piston 80, after closing openings 62 in the cylinder, is increasedly resisted. Thus the piston as it approaches the end of its travel toward the valve cage 45 will be highly resisted thereby preventing bottoming or more particularly the striking of the piston upon the valve cage with damaging effect.

As the piston moves away from the valve cage 45 upon the separating movements of the relatively movable members between which it is connected, it exerts pressure upon the fluid within the chamber 91 thereby actuating valve 74 to establish a restricted flow of fluid from chamber 91 through the piston passages 72 into the cylinder chamber 90. The fluid displaced from chamber 91 into chamber 90 is insufficient to fill said chamber, consequently, the valve 48 will be lifted to establish a substantially unrestricted fluid flow from the reservoir 24 through the opening 46 in the valve cage into the chamber 90 completely to fill it as the piston continues in its movement away from the valve cage 45.

From the aforegoing, it will be seen that the present invention provides for a simple construction by means of which restriction to the fluid flow of the shock absorber is increased as the piston approaches the end of its travel toward the valve cage member 45 thereby substantially preventing bottoming or more particularly the striking of the valve cage member by the piston with damaging effect.

While the embodiment of the present invention as herein disclosed, constitutes a preferred form, it is to be understood that other forms might be adopted, all coming within the scope of the claims which follow.

What is claimed is as follows:

1. A hydraulic shock absorber comprising a cylinder closed at one end, the other end communicating with a fluid reservoir; a valve-cage fitted into said other end of a cylinder, said cylinder having small openings in its wall adjacent the valve cage and larger openings in said wall more remote from said valve cage; a central opening in the valve cage, surrounded by a ridge on the cylinder side of the cage, said ridge providing a valve seat; a valve yieldably urged upon said seat; radial ducts in the valve cage, each duct terminating in an annular groove in the peripheral surface of the cage fitting within the cylinder and in the surface of the cage exposed to the fluid reservoir; a resilient disc valve urged against said surface of the valve cage, normally to close the ducts; notches in the cylinder end communicating with the annular groove in the valve cage; means cooperating with the cylinder and valve cage to provide a passage connecting the notches in the cylinder with the openings in the wall thereof; and a valved piston in the cylinder adapted to cover the larger openings therein during a certain range of movement of the piston in the cylinder.

2. A hydraulic shock absorber comprising a cylinder; a piston in said cylinder; a fluid reservoir in communication with one end of the cylinder; a valve cage fitting into said one end of the cylinder and having a valved passage operative to permit fluid to flow from the reservoir into the cylinder; an annular groove in the peripheral surface of the valve cage surrounded by the cylinder and in the surface of the valve cage exposed to the reservoir, said grooves being in communication with each other by ducts in the valve cage; a valve on the valve-cage biased to cover the annular groove exposed to the reservoir, and operative to permit a restricted flow therefrom into the reservoir; a plurality of orifices in the cylinder wall, certain of which open into the cylinder and others into the annular groove in the peripheral surface of the valve cage, certain of the orifices opening into the cylinder being constantly open and the others covered by the piston during a portion of its travel in the cylinder; and means surrounding the cylinder and valve cage, providing a connecting passage between all of the orifices in the cylinder wall.

3. A hydraulic shock absorber comprising a piston containing cylinder closed at one end; a fluid reservoir surrounding the cylinder; a fluid flow control device in the other end of the cylinder, said device consisting of a cage member having two, oppositely acting valves, one of which is operative to effect a flow of fluid from the reservoir into the cylinder as the piston moves away from said cage, said cylinder having a plurality of holes operative as long as the piston does not cover them, to effect fluid flow from the cylinder as the piston moves toward said cage, said cylinder having other holes more adjacent the cage, said other holes restricting fluid flow from the cylinder to a greater degree than the holes more remote from said cage; and means fitting about the cylinder and cooperating therewith to provide a passage connecting all of said holes with the second valve of the fluid flow control device.

EDWIN F. ROSSMAN.

REFERENCES CITED

The following references are of record in the file of this patent:

UNITED STATES PATENTS

| Number | Name | Date |
|---|---|---|
| 982,008 | Knapp | Jan. 17, 1911 |
| 1,658,962 | Aikens | Feb. 14, 1928 |
| 2,025,199 | Funston | Dec. 24, 1935 |
| 2,036,623 | Focht | Apr. 7, 1936 |
| 2,138,513 | Rossman et al. | Nov. 29, 1938 |
| 2,199,880 | Elliott | May 7, 1940 |
| 2,324,058 | Boor et al. | July 13, 1943 |
| 2,327,295 | Whisler | Aug. 17, 1943 |
| 2,332,161 | McIntyre et al. | Oct. 19, 1943 |